US 6,736,004 B2

(12) United States Patent
Evans et al.

(10) Patent No.: US 6,736,004 B2
(45) Date of Patent: May 18, 2004

(54) ULTRA-WIDE BAND SOIL/TIRE INTERACTION RADAR

(75) Inventors: Jim Evans, Tallulah, LA (US); George Mason, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1 day.

(21) Appl. No.: 09/882,408

(22) Filed: Jun. 15, 2001

(65) Prior Publication Data

US 2003/0154007 A1 Aug. 14, 2003

(51) Int. Cl.[7] .......................... G01M 9/00; G01C 21/26
(52) U.S. Cl. ........................................ 73/146; 701/223
(58) Field of Search ........................ 73/146, 178 R; 340/901, 998; 180/169; 701/200, 223; 342/5, 118, 123, 191

(56) References Cited

U.S. PATENT DOCUMENTS

| | | | |
|---|---|---|---|
| 3,948,080 A | 4/1976 | Boyd | 73/9 |
| 5,529,138 A * | 6/1996 | Shaw et al. | 180/169 |
| 5,675,081 A * | 10/1997 | Solheim et al. | 73/170.28 |
| 5,757,320 A | 5/1998 | McEwan | 342/387 |
| 5,777,220 A | 7/1998 | Matrascia et al. | 73/146 |
| 5,837,897 A | 11/1998 | Jones et al. | 73/599 |
| 6,011,505 A * | 1/2000 | Poehler et al. | 342/25 |
| 6,526,352 B1 * | 2/2003 | Breed et al. | 701/213 |

* cited by examiner

*Primary Examiner*—Willaim Oen
(74) *Attorney, Agent, or Firm*—John MacEvoy (57) ABSTRACT

A radar system for vehicle tire testing and analysis may be mounted within the casing of a vehicle tire to measure the location of the inner casing of the tire (tire deformation) as well as the location of the tire/soil interface (tire footprint). The radar system of the present invention may also be used to determine soil characteristics by analyzing the reflected signals. The present invention may have particular use in testing tires for use with on- or off-road surfaces. However, the present invention may also be used to monitor tire deformation, traction, footprint, and soil characteristics.

20 Claims, 6 Drawing Sheets

ULTRA-WIDE BAND SOIL/TIRE INTERACTION RADAR

FIELD OF THE INVENTION

The present invention relates to the application of wideband radar signals. In particular, the present invention is directed toward a technique for using wideband radar signals to measure the interaction between a tire and the soil in vehicle mobility assessment.

BACKGROUND OF THE INVENTION

Wheeled vehicle mobility depends in part on the interface between the tire and the on- or off-road surfaces on which the tire is operating. Studies of the interaction between a tire and soil, as a vehicle moves off-road, provides engineers information from which to draw conclusions about optimum tire design to maximize performance of the vehicle.

Traction of a wheeled vehicle is dependent largely upon the footprint of the tire. As soil deforms below the tire, the tire will passively shape itself to this deformation. Immobilization of the vehicle occurs when the sinkage of the tire and the net pull of all tires on the vehicle (referred to as "drawbar pull") reduce the traction of the vehicle to zero.

The interaction of vehicle tires and the soil is a subject of great concern. In military and emergency vehicle applications, vehicle immobilizion can have disastrous results. Moreover, an increasing number of civilian vehicles (e.g., SUVs, light trucks, and the like) are marketed with both off- and on-road capabilities. Thus, there is a pressing need to be able to study the interaction of vehicle tires and soil.

However, tire/soil interaction is difficult to study in real time since the presence of the tire itself prevents direct observations of any rutting or slippage under dynamic loading conditions. Large discontinuous deformations of soils are a key problem in vehicle mobility developments. Any attempt to place sensors in the soil may result in an intrusion into the soil resulting in variation in the soil parameters which the tire sees. Thus, what is required in the art is a method and apparatus which aids in the real-time study of soil/tire interaction.

In addition to testing purposes, a means of gathering tire/surface data in real time may be useful for other purposes as well. For example, such a system could be used with on-board vehicle traction control, dynamic braking (e.g., anti-lock controls), vehicle yaw controls, tire inflation and monitoring systems, and the like.

Such real-time data could be used to monitor relative traction at a given wheel and thus control power application to a given wheel before slippage occurs (as opposed to many present systems, which require wheel slippage before a given wheel is de-powered). Moreover, such real-time data could be useful in advising a driver of on- or off-road surface conditions (e.g., icing, snow, mud viscosity, and the like). Thus, for example, a driver could be alerted to the presence of black ice.

Prior art tire testing systems generally deal with looking for defects (occlusions and the like) within ties for production testing purposes, or are directed toward on-road testing techniques. Jones et al., U.S. Pat. No. 5,837,897, issued Nov. 17, 1998 and incorporated herein by reference, discloses an ultrasonic device for tire testing which may be used to determine tire pressure.

Matrascia, et al., U.S. Pat. No. 5,777,220, issued Jul. 7, 1998 and incorporated herein by reference, discloses a testing braking and traction of a wheel. Matrascia places the wheel/tire assembly onto a roller representing a road surface and tests the tire in that environment. Such testing techniques are known in the art, and while may provide adequate tire/road data, do not provide in situ tire/road data or off-road tire/soil data. Boyd, U.S. Pat. No. 3,948,080, issued Apr. 6, 1976, and incorporated herein by reference, discloses an apparatus for testing traction properties of pneumatic tires. Boyd provides a wheel with an instrumented hub which is then placed on a test trailer which is towed over a road surface. While this system may provide in situ data, it may have limited use in off-road data acquisition. Moreover, the apparatus does not provide real-time data on tire footprint or soil depression.

Recent advances in micro-impulse radar technology (MIR) have been developed at Lawrence Livermore Laboratories. Thomas E. McEwan has developed a number of applications for MIR technology. Representative of this technology is McEwan, U.S. Pat. No. 5,757,320, issued May 26, 1998 and incorporated herein by reference. MIR technology has been applied to a number of areas, including hidden object locators (i.e., "stud finder"), ground radar for finding buried objects (e.g., pipes, cables, and the like) as well as proximity sensors for car parking and cruise control systems. Some of these technologies are presently in production and may be commercially available.

However, to date, applicant is not aware of any activity, other than the inventor's, in applying MIR or other types of radar technology to the field of tire testing, particularly for off-road tire testing to quantify tire/soil interaction.

SUMMARY OF THE INVENTION

The present invention comprises a radar system which may be mounted within the casing of a vehicle tire to measure the location of the inner casing of the tire (tire deformation) as well as the location of the tire/soil interface (tire footprint). The radar system of the present invention may also be used to determine soil characteristics by analyzing the reflected signals.

The present invention may have particular use in testing tires for use with on- or off-road surfaces. However, the present invention may also be used to monitor tire deformation, traction, footprint, and soil characteristics.

The present invention comprises a system for generating at least one of tire, ground, and tire/ground data for a pneumatic tire having a casing forming a hollow inner portion for containing a gas, the pneumatic tire being in contact with a ground surface. The system comprises a radar transmitter, located within the hollow inner portion of the pneumatic tire, for generating a radar signal towards a portion of the pneumatic tire in contact with the ground surface. A radar receiver receives a reflected signal from at least one of an interface between the gas and the casing and an interface between the casing and the ground surface. A means is provided for analyzing the reflected signal to produce at least one of tire, ground, and tire/ground data.

In the system of the present invention, the radar signal may comprise an ultra-wide band radar pulse. The radar transmitter comprises a pulse repetition rate function generator for generating a pulse signal for triggering a radar pulse, an impulse function generator, coupled to the pulse repetition rate function generator, for receiving the pulse signal and generating a wide-band radar impulse in response to the pulse signal, a first amplifier, coupled to the impulse function generator, for amplifying the radar impulse and outputting an amplified radar impulse, a waveguide, coupled to the amplifier, for receiving and transmitting the amplified radar impulse, and a feedhorn, coupled to the waveguide, for receiving the amplified radar impulse and transmitting the radar impulse toward the tire casing.

The radar comprises a switch, coupled to the pulse repetition rate generator and the radar feedhorn, for alternately receiving an input pulse from the pulse repetition rate generator and radar return signals from the radar feedhorn, a second amplifier, coupled to the switch, for amplifying the input pulse and the radar return signals, a detector, coupled to the second amplifier, for detecting radar return pulse data from the radar return signals, and a data port, coupled to the detector, for outputting radar return pulse data.

The apparatus of the present invention may map dynamic deflection of the tire. To this end, the invention provides insight into contours of the tire during interaction of the tire and any contact surface. Definition of contact surfaces as a result of theses internal tire contours provides information supporting objective quantification of traction performance of a tire. The device provides insight into claims of tire manufacturers regarding the ability of the tire to prevent hydroplaning of wet surface. Furthermore, the device, when used in conjunction with central tire inflation systems and active suspension systems, may provide required information such that the devices can react to limitations in traction. Moreover, given that ride performance and tire traction of a vehicle are directly related to pressure, contact pressure, and dynamic deflections of the tire, the device may be used to support research, testing, and development in this arena.

DETAILED DESCRIPTION OF THE INVENTION

Figure 1:
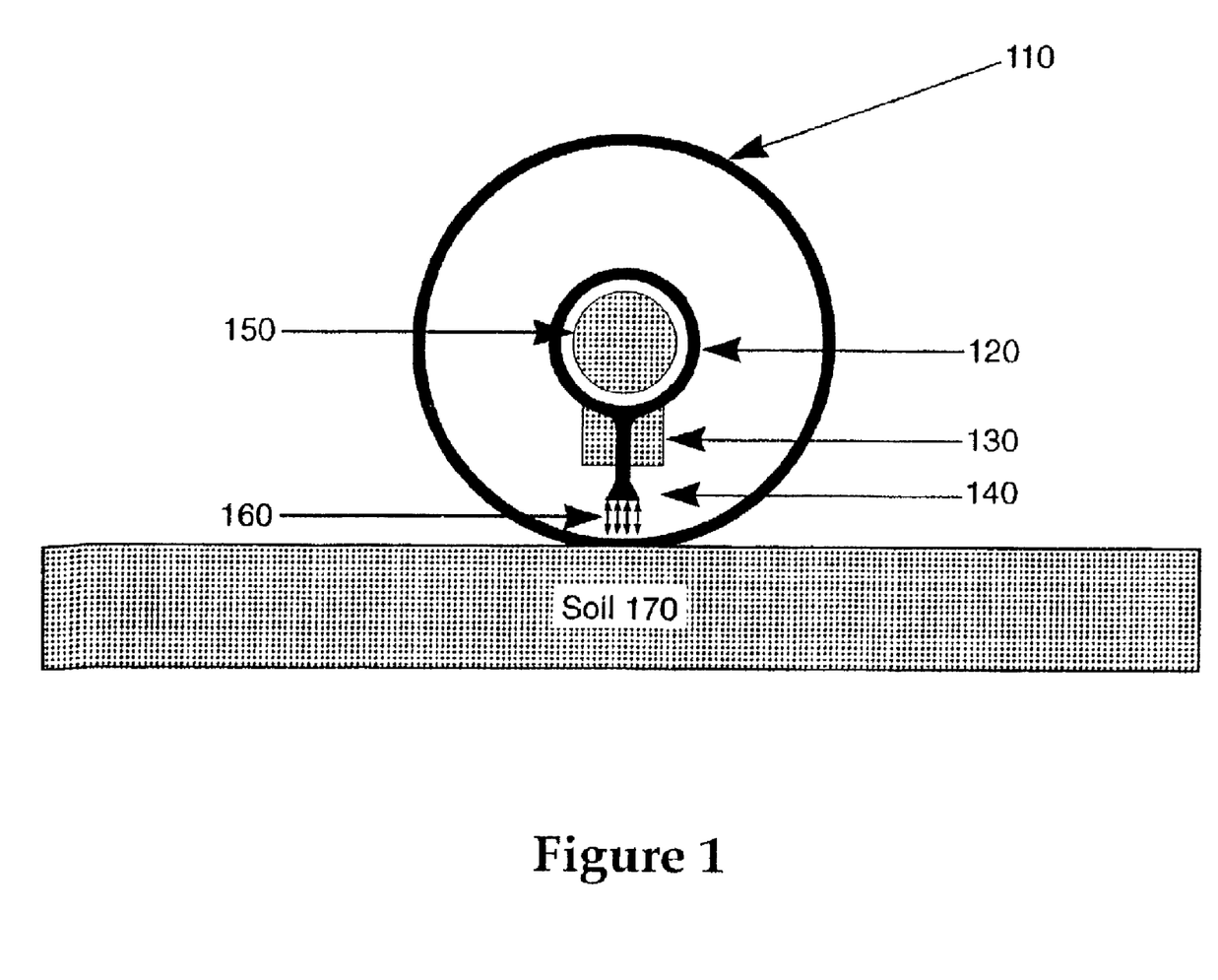
FIG. 1 is a side view schematic illustrating how an ultra-wideband radar may be attached internally to a wheel of a test vehicle in one embodiment of the present invention.

FIG. 1 is a side view schematic illustrating how an ultra-wideband radar 130 may be attached internally to a tire 110 of a test vehicle in one embodiment of the present invention. A slip ring (not shown) may be attached to the circumference of tire 110 and is used to maintain radar 130 in a vertical direction, pointing at the off road surface 170.

Waveguide 120 may encircle the slip ring and vehicle axle 150 to provide adequate travel time for the signal. Radar waves 160 from waveguide 120 may be fed to feed horn 140 which directs such waves downward through the tread of tire 110 to soil 170. Reflected waves 160 from soil 170 are fed back through feed horn 140 and waveguide 120 to electronics 130.

Data may be collected by focusing the ultra-wideband radar signals at the ground during testing. Radar 130 picks up signals indicative of the deformation of the soil below tire 110. These data are calibrated against external data and used to estimate stress and strain imposed on soil media 170.

Figure 2:
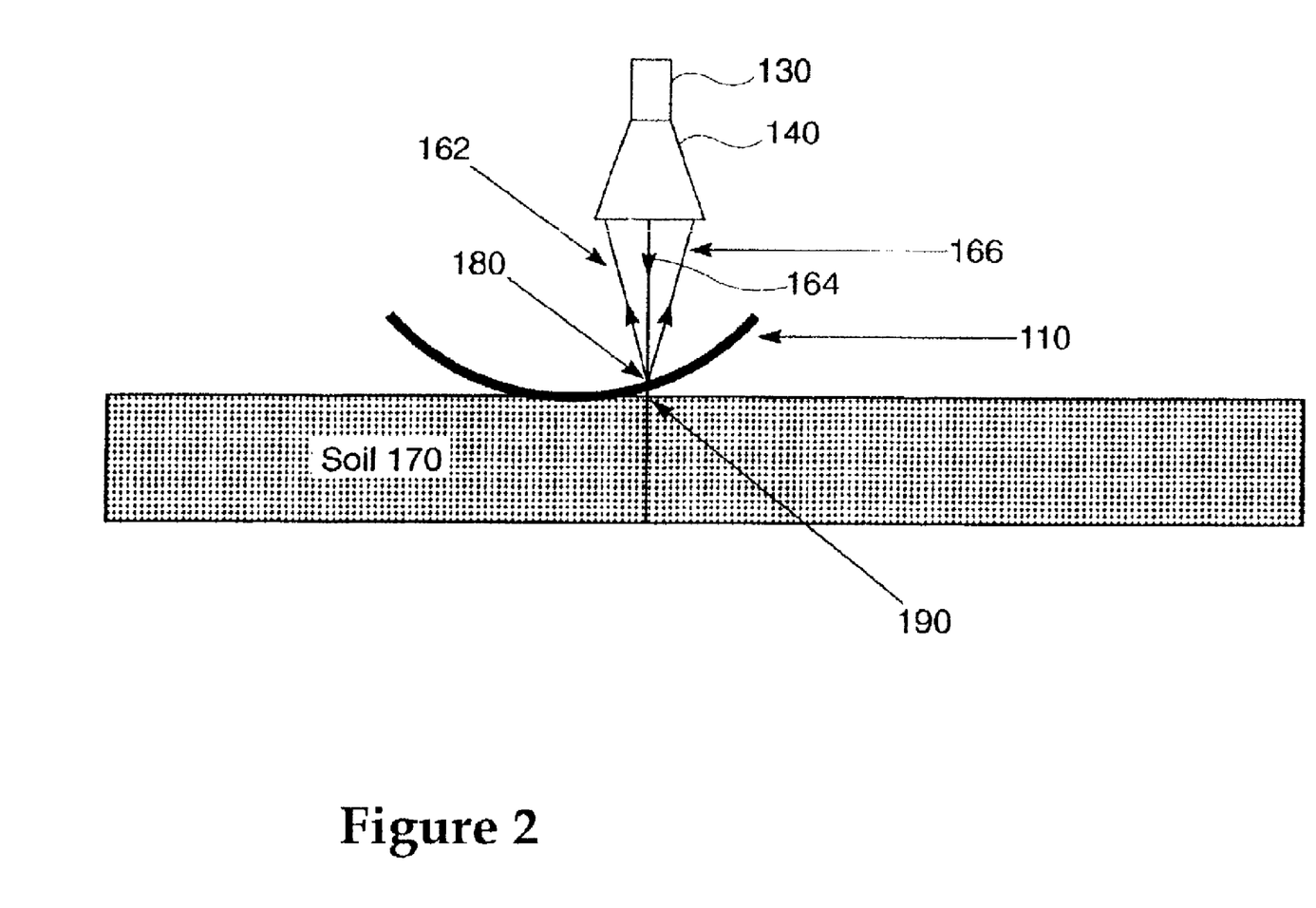
FIG. 2 is a more detailed illustration of how reflections of radar waves 160 of FIG. 1 occur in air/tire interface 180 and tire/soil interface 190.

FIG. 2 is a more detailed illustration of how reflections of radar waves 160 of FIG. 1 occur in air/tire interface 180 and tire/soil interface 190. Radar waves 160 of FIG. 1 are illustrated in FIG. 2 as source radar waves 164 and reflected radar waves 162 and 166.

Radar reflections are generally generated at the boundaries or surfaces between two materials having different impedances. Thus, a first reflection 166 may occur at the air/tire interface 180 between the air within tire 110 and the inner surface of tire 110. A second reflection 162 may occur at the tire/soil interface 190 between the outer surface of tire 110 and soil 170. First reflection 166 may be useful in determining the amount of tire deformation. Second reflection 162 may be useful in determining tire footprint, or how much soil 170 has deformed in response to the presence of tire 110.

Reflected signals 162 and 166 may be analyzed in radar electronics 130 or using an external waveform analyzer of computer software applying known signal processing techniques to determine where the reflections occurred and what was the nature of the media. Location of reflection 166, for example, will indicate how much the casing of tire 110 has deflected due to the load of the vehicle and the type of soil 170. Location of reflection 162 may indicate how large the tire footprint is (e.g., how much tire is in contact with soil 170).

Reflections from more than one location within the casing of tire 110 may be used to determine this overall footprint size. Alternately, sampled points may be measured and data extrapolated to determine tire footprint size. Finally, the nature of the reflected signal may be used to determine soil type and characteristics (e.g., rock, mud, clay, sand, or the like).

Figure 3:
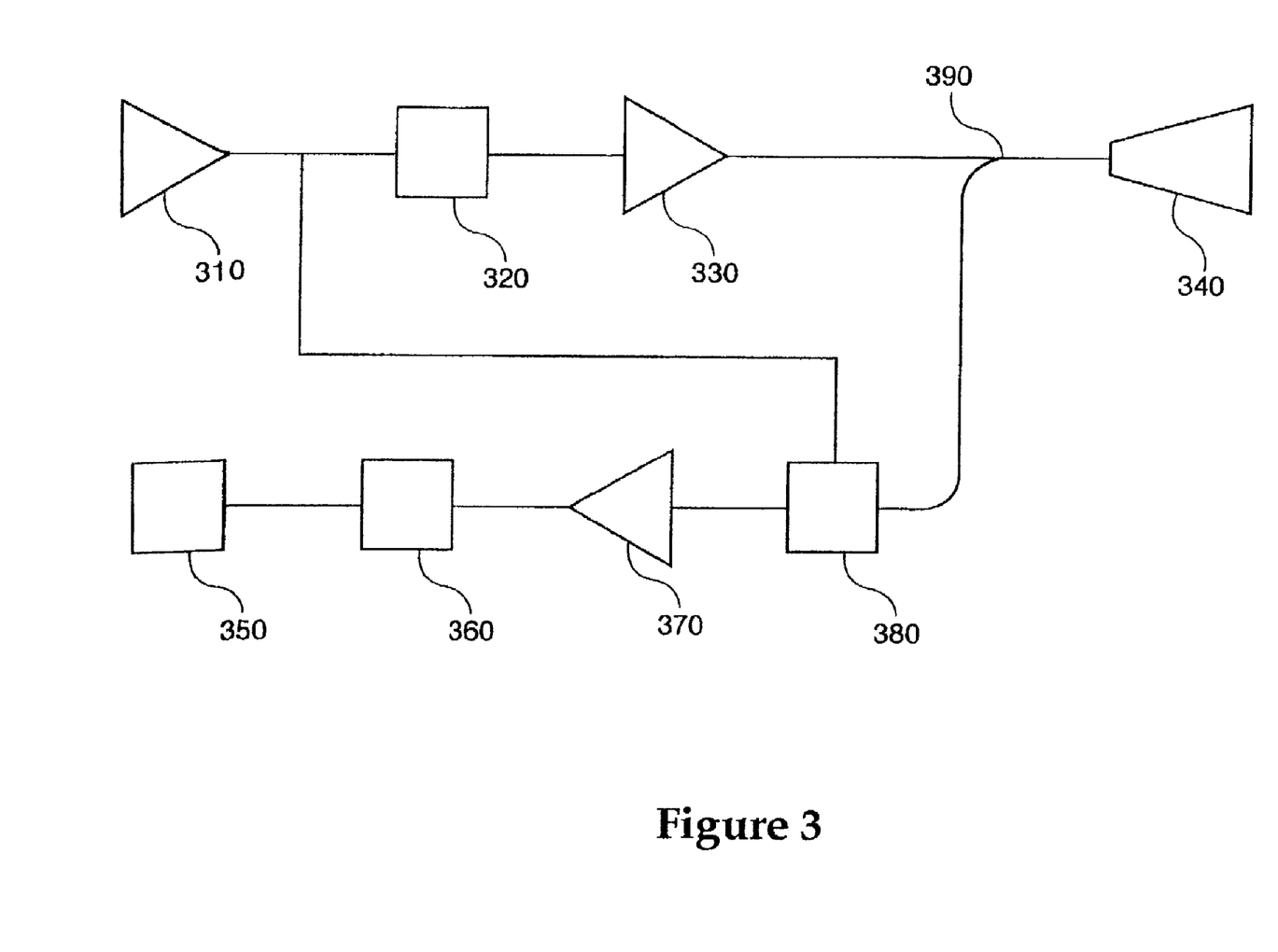
FIG. 3 is a block diagram of the ultra-wide band impulse radar of a first embodiment of the present invention.

FIG. 3 is a block diagram of the ultra-wide band impulse radar of a first embodiment of the present invention. Elements 310, 320, 330, and 390 form the transmitter portion of the first embodiment of the present invention. In FIG. 3, PRR (Pulse Repetition Rate) function 310 generates a pulse signal at a predetermined rate. The time period of the pulse rate should be greater than the amount of time for the radar signal to be transmitted to the air/tire and tire/soil interfaces, and return, to prevent interference between adjacent pulse signals.

Figure 5:
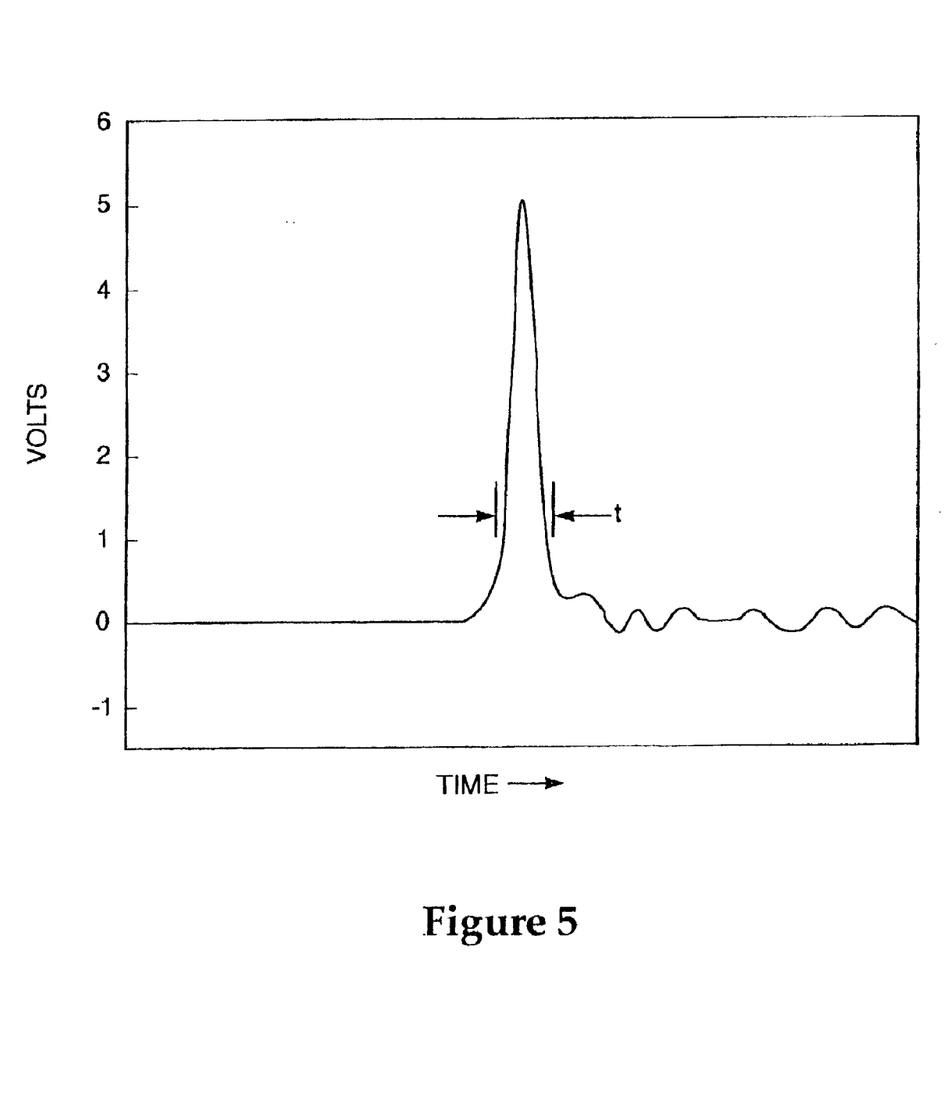
FIG. 5 is a waveform diagram illustrating the pulsed waveform generated by the impulse function block.

Impulse function generator 320 shapes each pulse from the pulse rate signal into a wide-band radar impulse as illustrated in FIG. 5. The radar impulse of FIG. 5 may comprise a high voltage near-instantaneous pulse having a pulse width t on the order of 100 picoseconds in length. The output of impulse function generator 320 may then be fed to amplifier 330 which amplifies the radar signal and outputs the impulse function signal through waveguide 390 through feedhorn antenna 340.

Elements 350, 360, 370, and 380 comprise the receiver of the first embodiment of the present invention. Switch 380 may alternately receive the input pulse repetition rate signal from PRR function 310 or radar return signals from feed horn antenna 340. These signals may be amplified in amplifier 370 and fed to detector 360 and communications port ("comm port") 350. Analysis of the resultant data signals may thus occur in an external data analysis device receiving data through com port 350. Alternately data may be analyzed within the device through the use of suitable electronics.

Figure 4:
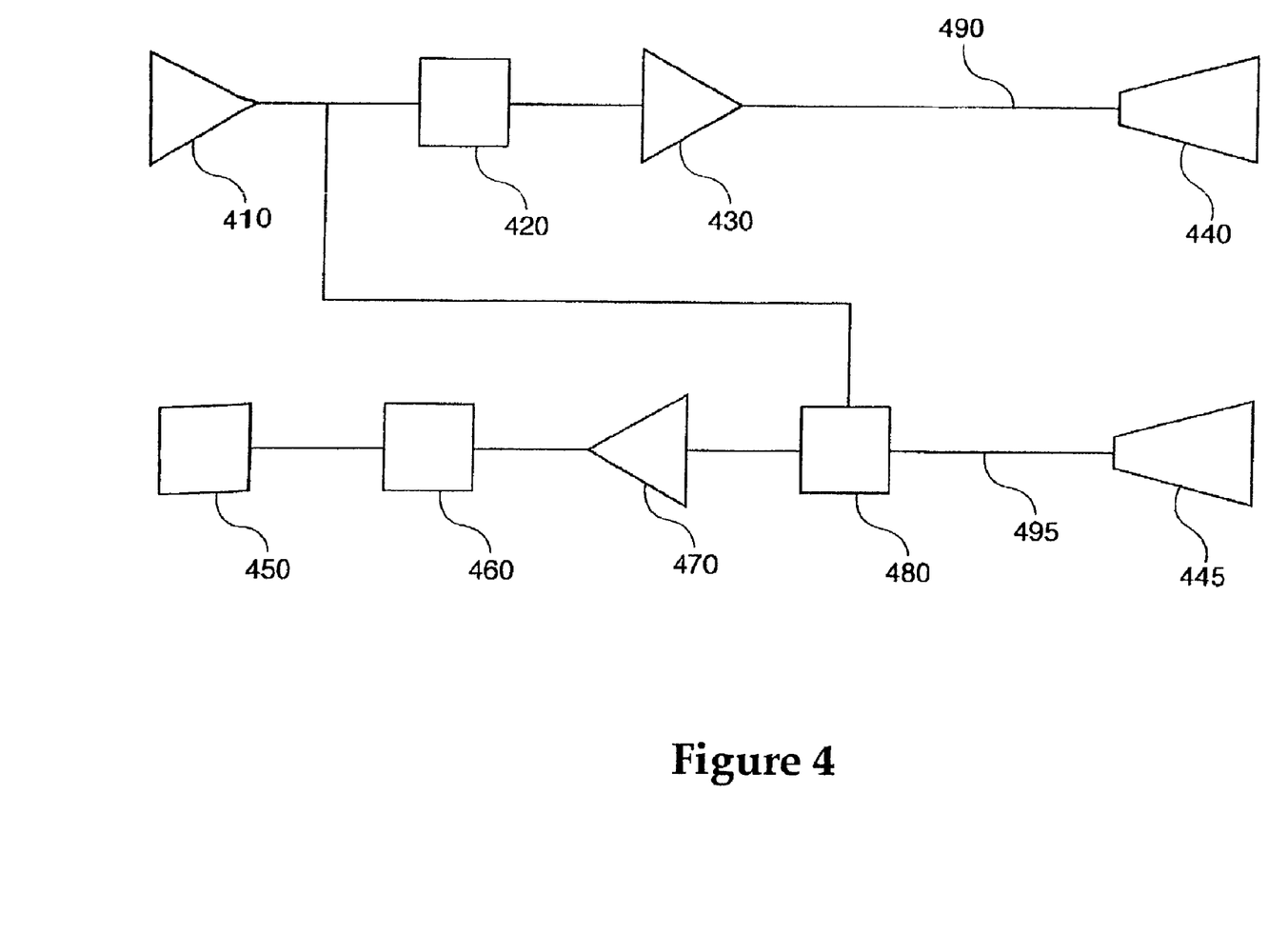
FIG. 4 is a block diagram of an alternative embodiment of the present invention incorporating a transceiver with dual feed horn antennas.

FIG. 4 is a block diagram of an alternative embodiment of the present invention incorporating a transceiver with dual feed horn antennas. In the apparatus of FIG. 4, elements 410, 420, 430, 490, and 440 comprise the transmitter portion of the alternative embodiment of the present invention. In FIG. 4, PRR (Pulse Repetition Radar) function 410 generates a pulse repetition rate signal. Impulse function generator 420 shapes this signal into an ultra-wide band radar impulse as illustrated in FIG. 5. The radar impulse of FIG. 5 may comprise a high voltage near-instantaneous pulse on the order of 100 picoseconds in length. The output of impulse function generator 420 may then be fed to amplifier 430 which amplifies the ultra-wide band radar signal and outputs the signal through waveguide 490 through feedhorn antenna 440.

Elements 450, 460, 470, 480, 495, and 445 comprise the receiver of the first embodiment of the present invention. In the embodiment of FIG. 4, a separate receiving feed horn antenna 445 may receive reflected radar signals from the air/tire interface or the tire/soil interface. These received signals may be fed to switch 280 through waveguide 495.

Switch 480 may alternately receive the input pulse repetition rate signal from PRR function 410 or radar return signals from receive feed horn antenna 445. These signals may be amplified in amplifier 470 and fed to detector 460 and com port 450. Analysis of the resultant data signals may thus occur in an external data analysis device receiving data through com port 450. Alternately data may be analyzed within the device through the use of suitable electronics.

Figure 6:
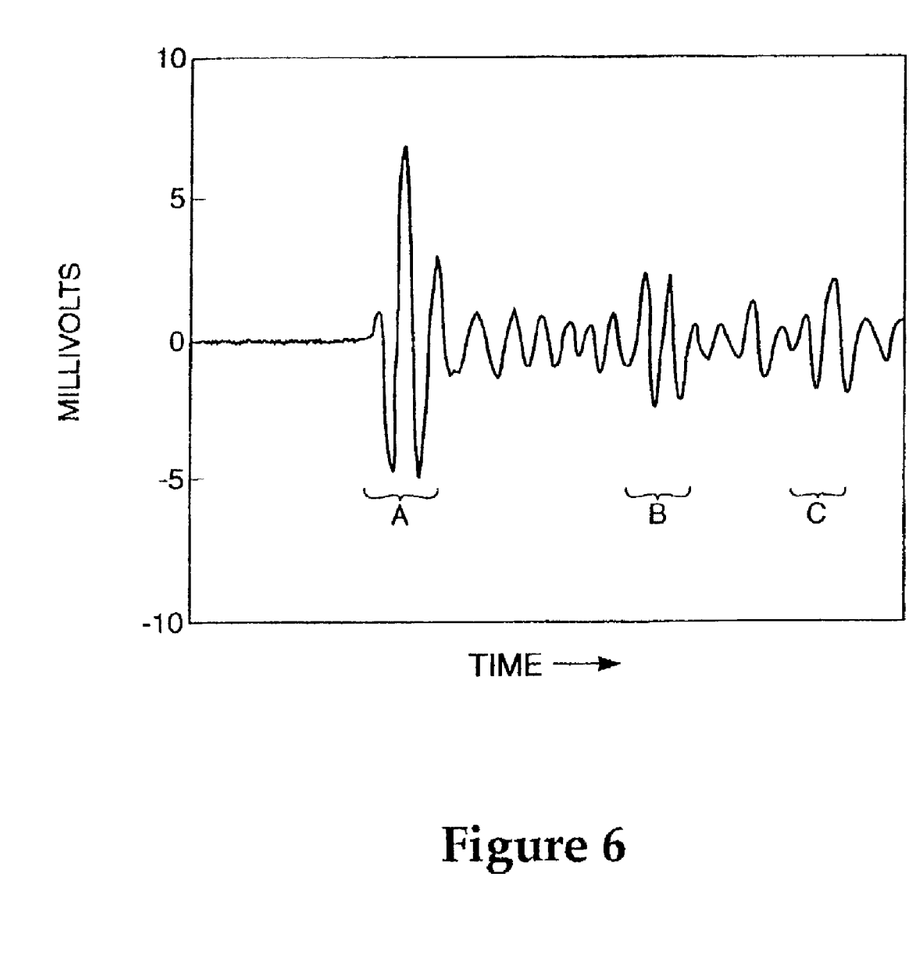
FIG. 6 is a waveform diagram illustrating the reflected signal with interface returns.

FIG. 6 is a waveform diagram illustrating the reflected signal with interface returns. With known media parameters, the reflected signals at the air/tire and tire/soil interfaces may be analyzed for time of flight and media characteristics. As illustrated in FIG. 6, the large initial pulse A represents the initial radar impulse generated by the radar. The next, more attenuated, pulse B represents the reflection from the air/tire interface.

The time distance between the two pulses represents the distance between the tire inner casing and the radar feedhorn. Thus, tire deflection can be measured accurately by measuring the time differences between these two pulses. In addition, other parameters of the second pulse, such as amplitude and duration, may provide information as to the amount of tire casing deflected.

The next, and even more attenuated, pulse C illustrated in FIG. 6 is generated by the tire/soil interface. Again, the distance between these pulses may represent a distance between the tire/soil interface and the feed horn. Again, the amplitude and duration of the pulse may be indicative of other features, such as tire footprint, soil type, and the like. In addition, a number of feedhorns may be directed at different portions within the tire casing to generate multiple radar data sets to map tire casing and tire/soil interface behavior.

While the preferred embodiment and various alternative embodiments of the invention have been disclosed and described in detail herein, it may be apparent to those skilled in the art that various changes in form and detail may be made therein without departing from the spirit and scope thereof.

For example, while the present invention has been disclosed in the context of tire and vehicle testing, the availability of such real-time data could be used in modern day vehicle control systems to provide additional data inputs on parameters such as tire inflation, wheel slippage, and other traction data. Moreover, with the increased availability of low-cost micro-impulse radars, such systems could be implemented at fairly reasonable costs.

For example, in a traction control embodiment, such real-time data could be used to monitor relative traction at a given wheel and thus control power application to a given wheel before slippage occurs. In contrast, most Prior Art systems require wheel slippage before a given wheel is de-powered. Similarly, such a system could be used to monitor wheel slippage for braking purposes as a sensor input to an anti-lock braking system to provide an indication of wheel locking before wheel lock actually occurs. Again, the in Prior Art, many such systems required actual wheel lock to occur before releasing braking pressure to a given wheel.

In a tire inflation monitoring embodiment, signals from the air/tire interface could be used to indicate effective tire diameter and thus tire inflation level. Low tire pressures could be alerted to the driver or used to activate on-board tire inflation systems.

In addition, such real-time data could be useful in advising a driver of on- or off-road surface conditions (e.g., icing, snow, mud viscosity, and the like). Thus, for example, a driver could be alerted to the presence of black ice, which may appear to the eye as water. Similarly, a driver could be apprised as to soil conditions (e.g., mud viscosity) without having to exit the vehicle. A driver could be warned, for example, if the system detects deep mush which could cause the vehicle to be immobilized. The driver could then retreat and try a different course without being stuck in deep mud.

We claim:

1. A system for generating at least one of tire, ground, and tire/ground data for an pneumatic tire having a casing forming a hollow inner portion for containing a gas, the pneumatic tire in contact with a ground surface, the system comprising:
    a radar transmitter, located within the hollow inner portion of the pneumatic tire, for generating a radar signal towards a portion of the pneumatic tire in contact with the ground surface;
    a radar receiver for receiving a reflected signal from at least one of an interface between the gas and the casing and an interface between the casing and the ground surface; and
    means for analyzing the reflected signal to produce at least one of tire, ground, and tire/ground data.

2. The system of claim 1, wherein said radar signal comprises an ultra-wide band radar pulse.

3. The system of claim 2, wherein said radar transmitter comprises:
    a pulse repetition rate function generator for generating a pulse signal for triggering a radar pulse;
    an impulse function generator, coupled to the pulse repetition rate function generator, for receiving the pulse signal and generating a wide-band radar impulse in response to the pulse signal;
    a first amplifier, coupled to the impulse function generator, for amplifying the radar impulse and outputting an amplified radar impulse;
    a first waveguide, coupled to the amplifier, for receiving and transmitting the amplified radar impulse; and
    a first feedhorn, coupled to the first waveguide, for receiving the amplified radar impulse and transmitting the radar impulse toward the tire casing.

4. The system of claim 3, wherein said radar receiver comprises:
    a switch, coupled to the pulse repetition rate generator and the first feedhorn through at least a portion of the first waveguide, for alternately receiving an input pulse from the pulse repetition rate generator and radar return signals from the first feedhorn;

a second amplifier, coupled to the switch, for amplifying the input pulse and the radar return signals;

a detector, coupled to the second amplifier, for detecting radar return pulse data from the radar return signals; and a data port, coupled to the detector, for outputting radar return pulse data.

5. The system of claim 3, wherein said radar receiver comprises:

a second feedhorn, for receiving reflected radar signals;

a second waveguide, for receiving and transmitting the reflected radar signals;

a switch, coupled to the pulse repetition rate generator and the second waveguide, for alternately receiving an input pulse from the pulse repetition rate generator and radar return signals from the second feedhorn;

a second amplifier, coupled to the switch, for amplifying the input pulse and the radar return signals;

a detector, coupled to the second amplifier, for detecting radar return pulse data from the radar return signals; and a data port, coupled to the detector, for outputting radar return pulse data.

6. The system of claim 1, wherein the means for analyzing the reflected signal outputs tire data representing an amount of tire casing deflection.

7. The system of claim 6, wherein the amount of tire casing deflection is determined by measuring a time difference between a transmitted radar impulse and a received reflected pulse from the tire casing.

8. The system of claim 1, wherein the means for analyzing the reflected signal outputs tire/ground data representing an amount of ground deflection.

9. The system of claim 8, wherein the amount of ground deflection is determined by measuring a time difference between a transmitted radar impulse and a received reflected pulse from the ground.

10. The system of claim 1, wherein the means for analyzing the reflected signal outputs ground data indicating at least one soil property, wherein the soil property is determined by measuring amplitude characteristics of a received reflected pulse from the ground.

11. A method of generating at least one of tire, ground, and tire/ground data for an pneumatic tire having a casing forming a hollow inner portion for containing a gas, the pneumatic tire in contact with a ground surface, the method comprising the steps of:

generating a radar signal, using a radar transmitter located within the hollow inner portion of the pneumatic tire, towards a portion of the pneumatic tire in contact with the ground surface, receiving a reflected signal in a radar receiver, from at least one of an interface between the gas and the casing and an interface between the casing and the ground surface, and analyzing the reflected signal to produce at least one of tire, ground, and tire/ground data.

12. The method of claim 11, wherein said radar signal comprises an ultra-wide band radar pulse.

13. The method of claim 12, wherein said step of generating a radar signal comprises the steps of:

generating, in a pulse repetition rate function generator, a pulse signal for triggering a radar pulse, receiving, in an impulse function generator coupled to the pulse repetition rate function generator, receiving the pulse signal and generating a wide-band radar impulse in response to the pulse signal, amplifying, in a first amplifier coupled to the impulse function generator, the radar impulse and outputting an amplified radar impulse, receiving and transmitting, in a first waveguide coupled to the amplifier, the amplified radar impulse, and receiving, in a first feedhorn coupled to the first waveguide, the amplified radar impulse and transmitting the radar impulse toward the tire casing.

14. The method of claim 13, wherein said step of receiving a reflected radar signal comprises the steps of:

alternately receiving, in a switch coupled to the pulse repetition rate generator and the first feedhorn through at least a portion of the first waveguide, an input pulse from the pulse repetition rate generator and radar return signals from the first feedhorn, amplifying, in a second amplifier coupled to the switch, the input pulse and the radar return signals, detecting, in a detector coupled to the second amplifier, radar return pulse data from the radar return signals, and outputting, from a data port coupled to the detector, radar return pulse data.

15. The method of claim 13, wherein said step of receiving a reflected radar signal comprises the steps of:

receiving, in a second feedhorn, reflected radar signals, receiving and transmitting, in a second waveguide, the reflected radar signals, alternately receiving, in a switch coupled to the pulse repetition rate generator and the second waveguide, an input pulse from the pulse repetition rate generator and radar return signals from the second feedhorn, amplifying, in a second amplifier coupled to the switch, the input pulse and the radar return signals, detecting, in a detector coupled to the second amplifier, radar return pulse data from the radar return signals, and outputting, from a data port coupled to the detector, radar return pulse data.

16. The method of claim 11, wherein the step of analyzing the reflected signal comprises the step of outputting tire data representing an amount of tire casing deflection.

17. The method of claim 16, wherein the amount of tire casing deflection is determined by measuring a time difference between a transmitted radar impulse and a received reflected pulse from the tire casing.

18. The method of claim 11, wherein the step of analyzing the reflected signal comprises the step of outputting tire/ground data representing an amount of ground deflection.

19. The method of claim 18, wherein the amount of ground deflection is determined by measuring a time difference between a transmitted radar impulse and a received reflected pulse from the ground.

20. The method of claim 11, wherein the step of analyzing the reflected signal comprises the step of outputting ground data indicating at least one soil property, wherein the soil property is determined by measuring amplitude characteristics of a received reflected pulse from the ground.

* * * * *